United States Patent
Nachenberg

(10) Patent No.: US 9,971,878 B2
(45) Date of Patent: May 15, 2018

(54) SYSTEMS AND METHODS FOR HANDLING FRAUDULENT USES OF BRANDS

(71) Applicant: Symantec Corporation, Mountain View, CA (US)

(72) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 558 days.

(21) Appl. No.: 14/469,571

(22) Filed: Aug. 26, 2014

(65) Prior Publication Data

US 2016/0063218 A1 Mar. 3, 2016

(51) Int. Cl.
| | |
|---|---|
| *G06F 21/10* | (2013.01) |
| *H04L 29/06* | (2006.01) |
| *H04L 12/26* | (2006.01) |
| *H04L 29/08* | (2006.01) |
| *G06Q 30/00* | (2012.01) |

(52) U.S. Cl.
CPC ............. *G06F 21/10* (2013.01); *G06Q 30/00* (2013.01); *H04L 43/04* (2013.01); *H04L 63/1408* (2013.01); *H04L 63/1483* (2013.01); *H04L 67/02* (2013.01)

(58) Field of Classification Search
CPC ......... G06F 21/10–21/16; G06Q 30/00; H04L 43/04; H04L 63/1408–63/1425; H04L 63/1441; H04L 63/1483; H04L 67/02–67/025; H04L 69/329
See application file for complete search history.

(56) References Cited

U.S. PATENT DOCUMENTS

| | | | |
|---|---|---|---|
| 8,271,588 B1 | 9/2012 | Bruno et al. | |
| 8,490,861 B1 | 7/2013 | Cidambi et al. | |
| 8,776,196 B1 | 7/2014 | Oliver et al. | |
| 8,904,512 B1* | 12/2014 | Chen | H04L 29/12433 380/264 |
| 8,918,387 B1 | 12/2014 | Sokolov | |
| 2003/0037010 A1* | 2/2003 | Schmelzer | G06F 17/30026 705/67 |
| 2007/0294762 A1 | 12/2007 | Shraim et al. | |

(Continued)

OTHER PUBLICATIONS

Oleg Kislyuk, et al; Systems and Methods for Detecting Suspicious Web Pages; U.S. Appl. No. 12/857,119, filed Aug. 16, 2010.

(Continued)

*Primary Examiner* — Kevin Bechtel
(74) *Attorney, Agent, or Firm* — FisherBroyles, LLP

(57) ABSTRACT

The disclosed computer-implemented method for handling fraudulent uses of brands may include (1) enabling a subscriber of a brand-protection service to select an action to perform when a fraudulent use of a brand is detected in Internet traffic that is transmitted via any of a plurality of Internet-traffic chokepoints that are managed by the brand-protection service, (2) monitoring, at each of the plurality of Internet-traffic chokepoints, Internet traffic for fraudulent uses of brands, (3) detecting, while monitoring the Internet traffic, the fraudulent use of the brand, and (4) performing the action in response to detecting the fraudulent use of the brand. Various other methods, systems, and computer-readable media are also disclosed.

17 Claims, 6 Drawing Sheets

(56) References Cited

U.S. PATENT DOCUMENTS

| | | | |
|---|---|---|---|
| 2008/0008348 A1* | 1/2008 | Metois | G06K 9/46 382/100 |
| 2010/0131558 A1* | 5/2010 | Logan | G06Q 50/184 707/783 |
| 2011/0276716 A1 | 11/2011 | Coulsen et al. | |
| 2013/0007271 A1 | 1/2013 | Stout et al. | |

OTHER PUBLICATIONS

Shaun Cooley; Systems and Methods for Performing Selective Deep Packet Inspection; U.S. Appl. No. 13/615,444, filed Sep. 13, 2012.

Yong Tian, et al; Systems and Methods for Accelerating Backup Operations; U.S. Appl. No. 13/835,035, filed Mar. 15, 2013.

Sourabh Satish; Systems and Methods for Updating Generic File—Classification Definitions; U.S. Appl. No. 14/210,364, filed Mar. 13, 2014.

Slawomir Grzonkowski; et al; Systems and Methods for Detecting Webpages Belonging to SPAM Campaigns; U.S. Appl. No. 14/071,029, filed Nov. 4, 2013.

Gianluca Stringhini, et al; Systems and Methods for Detecting Compromised Messaging Accounts; U.S. Appl. No. 14/133,567, filed Dec. 18, 2013.

Peter Ashley; Systems and Methods for Detecting Suspicious Internet Addresses; U.S. Appl. No. 14/324,824, filed Jul. 7, 2014.

"Broadcom and Norton Partner to Protect the Connected Home", http://www.broadcom.com/press/release.php?id=s741712, as accessed Jun. 18, 2014, PRNewswire, Broadcom Corporation, Irvine and Mountain View, CA, (Feb. 20, 2013).

"MarkMonitor®", https://www.markmonitor.com/, as accessed Jun. 18, 2014, (Mar. 3, 2000).

"Agari", http://agari.com/, as accessed Jun. 18, 2014, (Aug. 18, 2001).

"DMARC—What is it?", http://www.dmarc.org/, as accessed Jun. 18, 2014, (May 1, 2007).

"MarkMonitor Brand Protection: Protect the Brand Equity and Customer Loyalty You've Built", https://web.archive.org/web/20140704103842/https ://www.markmonitor.com/download/ds/ds-Markmonitor_Brand_Protection.pdf, Datasheet: MarkMonitor Brand Protection™, (Jul. 4, 2014).

* cited by examiner

SYSTEMS AND METHODS FOR HANDLING FRAUDULENT USES OF BRANDS

BACKGROUND

As the Internet has matured, the number of products and services that have been made accessible via the Internet, as well as the number of users accessing these products and services has increased. Users may be accustomed to using the Internet to access the products and services of certain legitimate entities with which the users are familiar. Consequently, unscrupulous and/or malicious parties may use (e.g., by impersonating) the brands with which users identify these products, services, and legitimate entities for various malicious and/or illegitimate purposes (e.g., Internet-based impersonation scams and attacks). For example, phishing websites may impersonate legitimate websites using the trusted brands of the legitimate websites (e.g., for the purpose of stealing confidential information from the legitimate websites' users). In another example, malicious applications may pose as applications of legitimate entities using the trusted brands of the legitimate entities (e.g., for the purpose of gaining access to confidential information stored on the computing devices to which the malicious applications are installed).

Various technologies exist that may protect end users from encountering some Internet-based scams and attacks that are perpetrated using the brands of legitimate entities. Unfortunately, these technologies may do little to protect brands or brand holders. Accordingly, the instant disclosure identifies and addresses a need for additional and improved systems and methods for handling fraudulent uses of brands.

SUMMARY

As will be described in greater detail below, the instant disclosure describes various systems and methods for handling fraudulent uses of brands. In one example, a computer-implemented method for handling fraudulent uses of brands may include (1) enabling a subscriber of a brand-protection service to select an action to perform when a fraudulent use of a brand (e.g., a scam or attack that uses the brand) is detected in Internet traffic that is transmitted via any of a plurality of Internet-traffic chokepoints that are managed by the brand-protection service, (2) monitoring, at each of the plurality of Internet-traffic chokepoints, Internet traffic for fraudulent uses of brands, (3) detecting, while monitoring the Internet traffic, the fraudulent use of the brand, and (4) performing the action in response to detecting the fraudulent use of the brand.

In some embodiments, the fraudulent use of the brand may include a scam that uses the brand to impersonate a trusted entity, a phishing attack that uses the brand to impersonate a holder of the brand, a website that uses the brand without permission from a holder of the brand, an Internet communication that uses the brand without permission from a holder of the brand, and/or an application that uses the brand without permission from a holder of the brand.

In some embodiments, the action may include providing information about the fraudulent use of the brand to the subscriber, automatically redirecting a user that encountered the fraudulent use of the brand to a legitimate website, presenting a link to a legitimate website to a user that encountered the fraudulent use of the brand, presenting a legitimate application to a user that would have encountered a fraudulent application, and/or performing a service for taking down an illegitimate website involved in the fraudulent use of the brand.

In some embodiments, the method may further include (1) determining, in response to detecting the fraudulent use of the brand, that a holder of the brand is not a subscriber of the brand-protection service and (2) notifying, in response to determining that the holder of the brand is not a subscriber of the brand-protection service, the holder of the brand of the fraudulent use of the brand and/or one or more brand-protection offerings provided by the brand-protection service to brand holders.

In some embodiments, the step of monitoring Internet traffic for fraudulent uses of brands may include monitoring email communications for fraudulent uses of brands, monitoring web traffic for fraudulent uses of brands, and/or monitoring application downloads for fraudulent uses of brands.

In some embodiments, the plurality of Internet-traffic chokepoints may include one or more network components of a communications service provider (e.g., one or more network components of an Internet service provider or a wireless-communication service provider), one or more residential gateways (e.g., cable modems or Digital Subscriber Line (DSL) modems), and/or one or more endpoint devices (e.g., laptops, tablets, or smartphones).

In one embodiment, a system for implementing the above-described method may include (1) a subscriber module, stored in memory, that enables a subscriber of a brand-protection service to select an action to perform when a fraudulent use of a brand is detected in Internet traffic that is transmitted via any of a plurality of Internet-traffic chokepoints that are managed by the brand-protection service, (2) a monitoring module, stored in memory, that monitors, at each of the plurality of Internet-traffic chokepoints, Internet traffic for fraudulent uses of brands, (3) a detecting module, stored in memory, that detects, while monitoring the Internet traffic, the fraudulent use of the brand, (4) a performing module, stored in memory, that performs the action in response to detecting the fraudulent use of the brand, and (5) at least one processor that executes the subscriber module, the monitoring module, the detecting module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) enable a subscriber of a brand-protection service to select an action to perform when a fraudulent use of a brand is detected in Internet traffic that is transmitted via any of a plurality of Internet-traffic chokepoints that are managed by the brand-protection service, (2) monitor, at each of the plurality of Internet-traffic chokepoints, Internet traffic for fraudulent uses of brands, (3) detect, while monitoring the Internet traffic, the fraudulent use of the brand, and (4) perform the action in response to detecting the fraudulent use of the brand.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
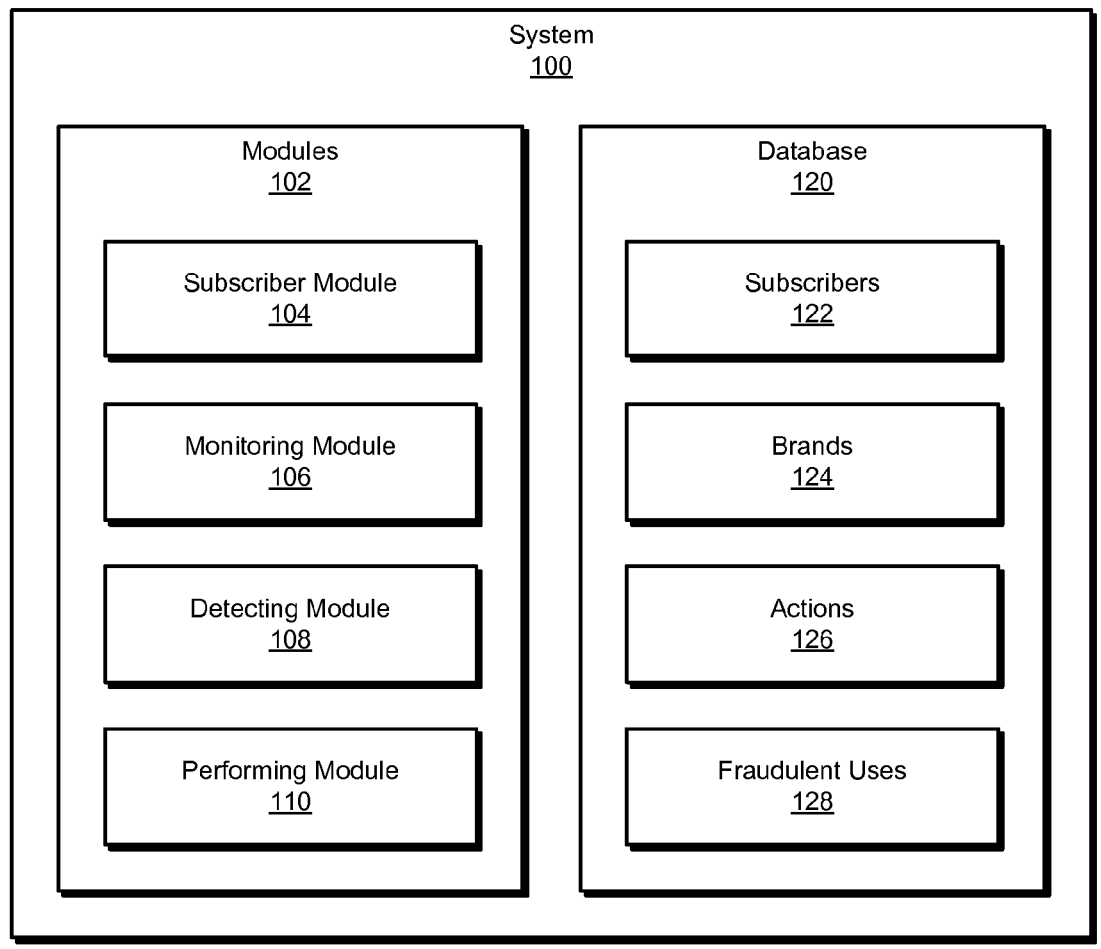
FIG. 1 is a block diagram of an exemplary system for handling fraudulent uses of brands.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for handling fraudulent uses of brands. As will be explained in greater detail below, by monitoring Internet traffic at a large number of Internet-traffic chokepoints (e.g., endpoint devices, residential gateways, enterprise network gateways, and carrier network devices) for fraudulent uses of brands (e.g., Internet-based scams or attacks that use the brands), the systems and methods described herein may enable a subscriber (e.g., a brand holder) of a brand-protection service to cause the brand-protection service to perform various brand-protecting actions whenever a fraudulent use of a particular brand of interest is detected via the Internet-traffic chokepoints. Embodiments of the instant disclosure may also provide various other advantages and features, as discussed in greater detail below.

Figure 2:
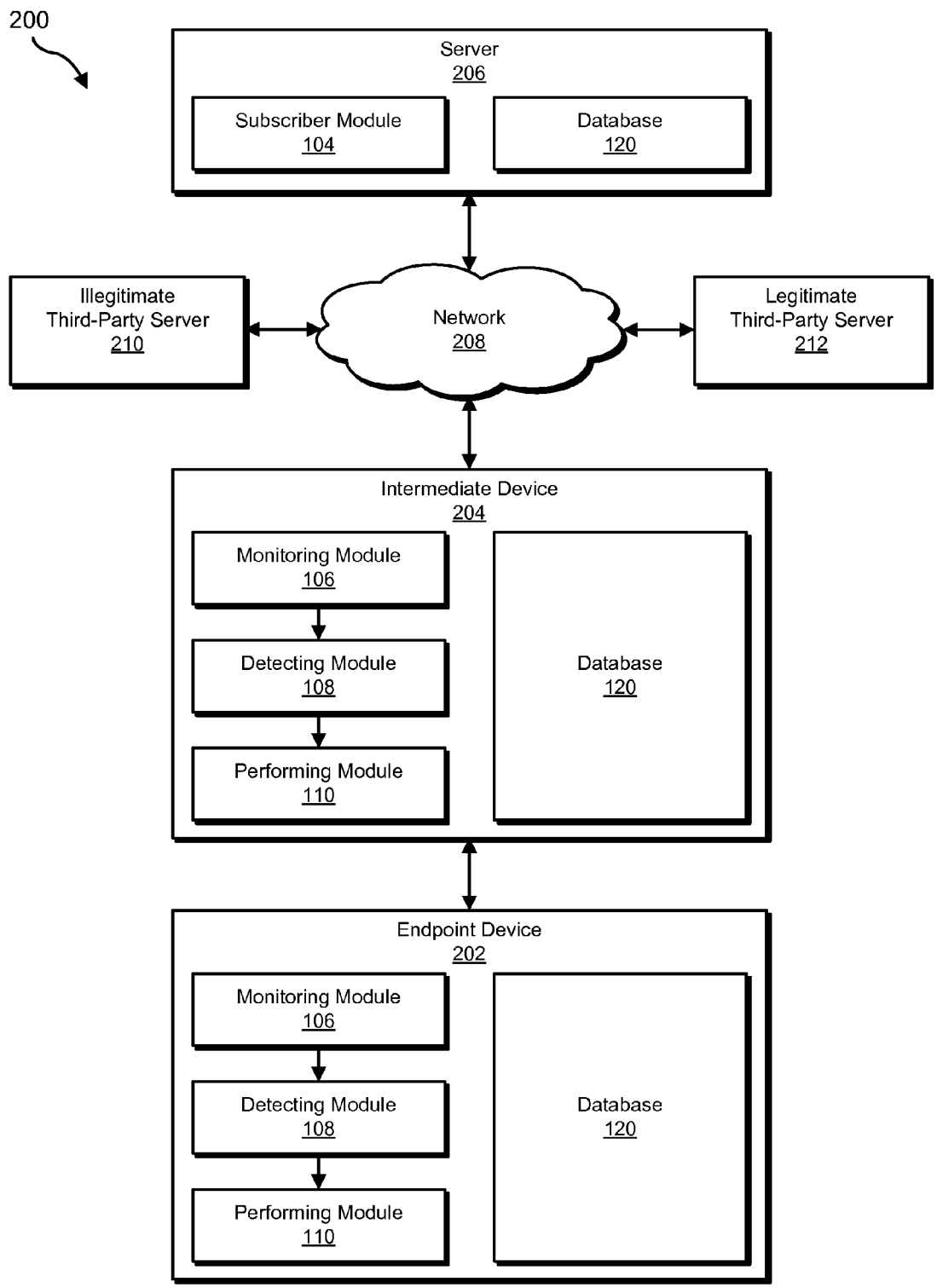
FIG. 2 is a block diagram of an additional exemplary system for handling fraudulent uses of brands.

The following will provide, with reference to FIGS. 1 and 2, detailed descriptions of exemplary systems for handling fraudulent uses of brands. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for handling fraudulent uses of brands. As illustrated in this figure, exemplary system 100 may include one or more modules 102 for performing one or more tasks. For example, and as will be explained in greater detail below, exemplary system 100 may include a subscriber module 104 that enables a subscriber of a brand-protection service to select an action to perform when a fraudulent use of a brand is detected in Internet traffic that is transmitted via any of a plurality of Internet-traffic chokepoints that are managed by the brand-protection service. Exemplary system 100 may also include a monitoring module 106 that monitors, at each of the plurality of Internet-traffic chokepoints, Internet traffic for fraudulent uses of brands.

In addition, and as will be described in greater detail below, exemplary system 100 may include a detecting module 108 that detects, while monitoring the Internet traffic, the fraudulent use of the brand. Exemplary system 100 may also include a performing module 110 that performs the action in response to detecting the fraudulent use of the brand. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint device 202, intermediate device 204, and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks. For example, one or more of modules 102 in FIG. 1 may represent all or portions of a brand-protection service that performs various actions in response to detecting fraudulent uses of brands at Internet-traffic chokepoints managed or operated by the brand-protection service.

As illustrated in FIG. 1, exemplary system 100 may also include one or more databases, such as database 120. In one example, database 120 may store information about one or more subscribers of a brand-protection service (e.g., subscribers 122), information about one or more brands protected by the brand-protection service (e.g., brands 124), information about one or more actions that may be performed by the brand-protection service when fraudulent uses of brands are detected at Internet-traffic chokepoints managed by the brand-protection service (e.g., actions 126), and/or information about one or more fraudulent uses of brands that are monitored by the brand-protection service (e.g., fraudulent uses 128).

Database 120 may represent portions of a single database or computing device or a plurality of databases or computing devices. For example, database 120 may represent a portion of endpoint device 202, intermediate device 204, and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as endpoint device 202, intermediate device 204, and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include an endpoint device 202, an intermediate device 204, and a server 206 in communication via a network 208. In one example, endpoint device 202 or intermediate device 204 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of endpoint device 202, intermediate device 204, and/or server 206, enable endpoint device 202, intermediate device 204, and/or server 206 to handle fraudulent uses of brands. For example, and as will be described in greater detail below, one or more of modules 102 may cause endpoint device 202, intermediate device 204, and/or server 206 to (1) enable a subscriber of a brand-protection service to select an action to perform when a fraudulent use of a brand is detected in Internet traffic that is transmitted via any of a plurality of Internet-traffic chokepoints that are managed by the brand-protection service (e.g., endpoint 202 and intermediate device 204), (2) monitor, at each of the plurality of Internet-traffic chokepoints, Internet traffic (e.g., Internet traffic transferred to and from illegitimate third-party server 210 and legitimate third-party server 212) for fraudulent uses of brands, (3) detect, while monitoring the Internet traffic, the fraudulent use of the brand, and (4) perform the action in response to detecting the fraudulent use of the brand.

Endpoint device 202 generally represents any type or form of computing device capable of reading computer-executable instructions and/or any device whose users may encounter a fraudulent use of a brand using the device. Examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Intermediate device 204 generally represents any type or form of computing device capable of reading computer-executable instructions and/or any device through which Internet traffic may be transmitted to or from an endpoint device (e.g., endpoint device 202). Examples of intermediate device 204 include, without limitation, residential gateways, modems, wireless access points, network gateways, Internet gateways, network routers, email gateways, network firewalls, proxy servers, any network component of a communications service provider, or any other suitable computing device.

Server 206 generally represents any type or form of computing device that is capable of reading computer-executable instructions. Examples of server 206 include, without limitation, application servers and database servers configured to provide various database services and/or run certain software applications.

Network 208 generally represents any medium or architecture capable of facilitating communication or data transfer. Examples of network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 208 may facilitate communication or data transfer using wireless or wired connections. In one embodiment, network 208 may facilitate communication between endpoint 202, intermediate device 204, server 206, illegitimate third-party server 210, and legitimate third-party server 212.

As illustrated in FIG. 2, endpoint device 202 and intermediate device 204 may be capable of exchanging Internet traffic with illegitimate third-party server 210 and legitimate third-party server 212 via network 208. Illegitimate third-party server 210 generally represents any type or form of computing device or service that may transmit Internet traffic that includes a fraudulent use of a brand and/or that may be used to perform a fraudulent use of a brand. For example, illegitimate third-party server 210 may represent a computing device that hosts a phishing website. On the other hand, legitimate third-party server 212 generally represents any type or form of computing device that does not transmit Internet traffic that includes a fraudulent use of a brand and/or that is not used to perform a fraudulent use of a brand. For example, legitimate third-party server 212 may represent a computing device that hosts a website of a brand holder or other legitimate entity.

Figure 3:
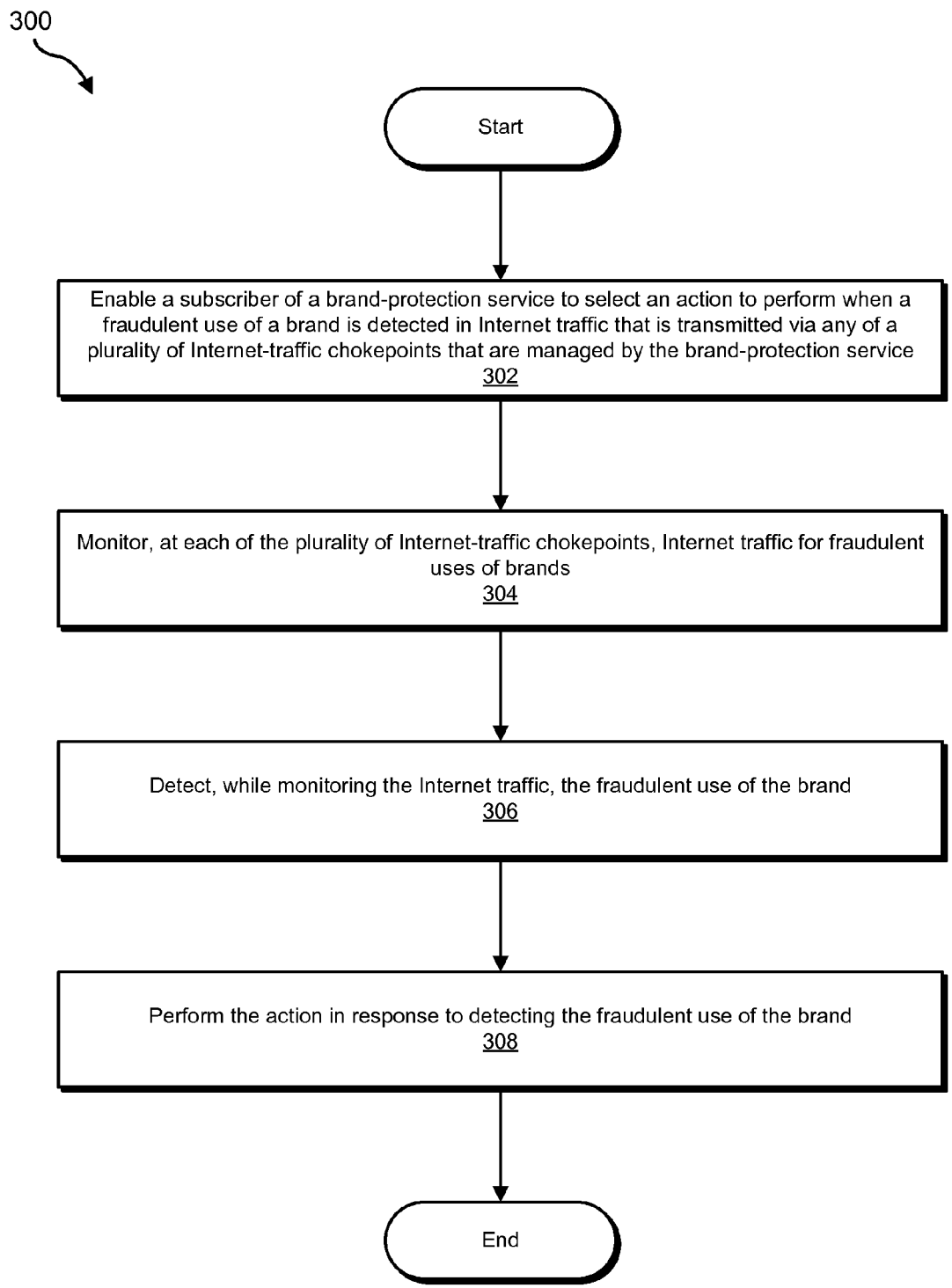
FIG. 3 is a flow diagram of an exemplary method for handling fraudulent uses of brands.

FIG. 3 is a flow diagram of an exemplary computer-implemented method 300 for handling fraudulent uses of brands. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may enable a subscriber of a brand-protection service to select an action to perform when a fraudulent use of a brand is detected in Internet traffic that is transmitted via any of a plurality of Internet-traffic chokepoints that are managed by the brand-protection service. For example, subscriber module 104 may, as part of server 206 in FIG. 2, enable a subscriber of a brand-protection service to select an action to perform when an impersonation scam or attack is detected in Internet traffic that is transmitted via endpoint device 202 or intermediate device 204.

The systems described herein may perform step 302 in a variety of contexts. For example, subscriber module 104 may, as part of a brand-protection service, enable subscribers of the brand-protection service to select actions to perform when fraudulent uses of brands are detected by the brand-protection service. As used herein, the term "brand-protection service" generally refers to any system or service that manages, controls, or operates a large number of Internet-traffic chokepoints and that is capable of performing, when fraudulent uses of brands are detected at the Internet-traffic chokepoints, various actions via the Internet-traffic chokepoints on behalf of subscribers of the brand-protection service. In general, a brand-protection service may enable any legitimate entity to subscribe to the brand-protection service.

The term "Internet-traffic chokepoint" generally refers to any computing device that is managed by a brand-protection service and/or any computing device that is capable of monitoring the Internet traffic that it sends, receives, or transfers. Examples of Internet-traffic chokepoints include, without limitation, end-user computing devices (e.g., laptops, desktops, tablets, and smartphones), networking devices (e.g., residential gateways, enterprise gateways, and components of a carrier network), and endpoint device 202 and intermediate device 204 in FIG. 2.

In some examples, a brand-protection service may manage an Internet-traffic chokepoint via an agent installed on the Internet-traffic chokepoint. In at least one example, an agent installed on an Internet-traffic chokepoint may include one or more of modules 102 in FIG. 1. In some examples, an agent may be installed on an Internet-traffic chokepoint as part of a free or low-cost security service that is offered by the provider of the brand-protection service to end users, Internet service providers, and/or communication service providers. In some examples, the free or low-cost security service may offer additional security features in addition to brand protection. For example, the free or low-cost security service may be capable of detecting and blocking Internet-based scams and attacks.

In some examples, the provider of the brand-protection service may include an agent in a free or low-cost application that may be installed on an endpoint device and that may offer various antivirus and/or Internet security services to users of the endpoint device. In other examples, the provider of the brand-protection service may include an agent in a free or low-cost offering that is provided to Internet service providers that may be installed on residential gateways provided by the Internet service providers. In another example, the provider of the brand-protection service may include an agent in a free or low-cost offering provided to communication service providers that may be installed on components of the communication service providers' backbone networks.

The systems described herein may perform step 302 in any suitable manner. In one example, subscriber module 104 may enable a subscriber to select or specify a brand that the subscriber wishes to be monitored by a brand-protection service. As used herein, the term "brand" generally refers to any combination of visual or auditory elements that may be used to (1) identify an entity (e.g., a corporation, an association, or an organization), a product, or a service and/or (2) distinguish an entity, a product, or a service from other entities, products, and services. Examples of brands include, without limitation, names, terms, logos, designs, symbols, trademarks, taglines, shapes, colors, sounds, images, and/or combinations of one or more of the same.

Generally, after a subscriber has selected a brand that the subscriber wishes to be monitored by a brand-protection service, subscriber module 104 may enable the subscriber to select one or more actions that the brand-protection service will perform on behalf of the subscriber when any of a variety of fraudulent uses of the brand are detected by the brand-protection service. As used herein, the phrase "fraudulent use of a brand" generally refers to any deceptive, misleading, unauthorized, or illegal use of a brand or an imitation of a brand. Examples of fraudulent uses of a brand include, without limitation, scams that use a brand or an imitation of a brand to impersonate a trusted entity (e.g., a brand holder), phishing attacks that use a brand or an imitation of a brand to impersonate a brand holder, websites that use a brand or an imitation of a brand without permission (e.g., a website that uses a brand or an imitation of a brand to sell counterfeit products or services or a website of an unauthorized reseller), Internet communications (e.g., emails or text messages) that use a brand or an imitation of a brand without permission from a brand holder, and/or applications that use a brand or an imitation of a brand without permission from the holder of the brand.

In some examples, subscriber module 104 may enable a subscriber to select or specify a legitimate website to which the brand-protection service should automatically redirect users that encounter a fraudulent use of a brand. For example, subscriber module 104 may enable a brand holder to specify a website to which users that attempt to access a phishing website that uses a brand of the brand holder should be automatically redirected. In another example, subscriber module 104 may enable a brand holder to specify a website of the brand holder or a website of an authorized reseller of the brand holder to which users that attempt to access a website of an unauthorized reseller will be automatically redirected. In at least one example, subscriber module 104 may enable a subscriber to select to have the brand-protection service automatically redirect users that attempt to access an illegitimate website that is impersonating a legitimate website to the legitimate website (e.g., the website that the users thought they were attempting to access).

In some examples, subscriber module 104 may enable a subscriber to select or specify information (e.g., a message, a logo, or a link to a legitimate website) that the brand-protection service should present to users that encounter a fraudulent use of a brand. For example, subscriber module 104 may enable a brand holder to specify a link to a website of the brand holder that the brand-protection service should present to users that attempt to access a phishing website or any other illegitimate website that uses a brand of the brand holder. In another example, subscriber module 104 may enable a subscriber that is not a brand holder (e.g., a competitor of a brand holder) to specify a link to a legitimate website (e.g., a website of a legitimate competitor of the brand holder) that the brand-protection service should present to users that attempt to access a phishing website or any other illegitimate website that uses a brand.

In some examples, subscriber module 104 may enable a subscriber to select or specify a legitimate application that the brand-protection service should present to users that attempt to download or install an illegitimate application that uses a brand. For example, subscriber module 104 may enable a brand holder to specify an application of the brand holder that the brand-protection service should present to users that attempt to download or install an illegitimate application that uses a brand of the brand holder.

In some examples, subscriber module 104 may enable a subscriber to select to have a brand-protection service attempt to reduce or eliminate a fraudulent use of a brand. For example, subscriber module 104 may enable a brand holder to select to have the brand-protection service attempt to take down an illegitimate website. In another example, subscriber module 104 may enable a brand holder to select to have the brand-protection service attempt to have an illegitimate application removed from an application marketplace. In at least one example, subscriber module 104 may enable a brand holder to select to have the brand-protection service file a lawsuit on behalf of the brand-holder.

Additionally or alternatively, subscriber module 104 may enable a subscriber to instruct a brand-protection service to perform, on behalf of the subscriber, any action that protects a brand or a brand holder, that prevents users from encountering and/or falling victim to fraudulent uses of a brand, that improves how users experience encountering a fraudulent use of a brand, that eliminates how a fraudulent use of a brand inconveniences users, and/or that prevents fraudulent uses of brands. In at least one example, subscriber module 104 may enable a subscriber to request information about or notifications of fraudulent uses of a brand from a brand-protection service.

At step 304, one or more of the systems described herein may monitor, at each of a plurality of Internet-traffic chokepoints, Internet traffic for fraudulent uses of brands. For example, monitoring module 106 may, as part of endpoint device 202 and/or intermediate device 204 in FIG. 2, monitor Internet traffic for impersonation scams and attacks.

The systems described herein may monitor various types of Internet traffic. As used herein, the term "Internet traffic" generally refers to any transfer of data (e.g., packets, streams, or files) between two computing devices, especially any transfer of data between two computing devices via the Internet. Using FIG. 2 as an example, the term "Internet traffic" may refer to data transferred between endpoint device 202 or intermediate device 204 and one or more of server 206, illegitimate third-party server 210, and legitimate third-party server 212 via network 208. In some examples, monitoring module 106 may monitor web traffic, hypertext transfer protocol (HTTP) traffic, email traffic, and/or Domain Name System (DNS) traffic for fraudulent uses of brands.

The systems described herein may monitor Internet traffic for fraudulent uses of brands in any suitable manner. For example, monitoring module 106 may monitor Internet traffic for scams that may use a brand to impersonate a trusted entity, phishing attacks that may use a brand to impersonate a brand holder, illegitimate websites that may use a brand without permission, illegitimate Internet communications that may use a brand without permission, and/or illegitimate applications that may use a brand without permission. Monitoring module 106 may monitor Internet traffic for these fraudulent uses of brands using any suitable monitoring technique (e.g., deep packet inspection (DPI), fingerprint inspection, heuristic analysis, reputation analysis, domain name analysis, etc.). In at least one example, monitoring module 106 may monitor Internet traffic for fraudulent uses of brands as part of an application that is installed on an Internet-traffic chokepoint and that is capable of detecting and blocking fraudulent uses of brands (e.g., an application that is capable of detecting and blocking Internet-based impersonation scams and attacks).

At step 306, one or more of the systems described herein may detect, while monitoring Internet traffic, a fraudulent use of a brand. For example, detecting module 108 may, as part of endpoint device 202 and/or intermediate device 204 in FIG. 2, detect an impersonation scam or attack that uses a brand while monitoring Internet traffic.

The systems described herein may perform step 306 in any suitable manner. For example, detecting module 108 may detect a fraudulent use of a brand by detecting that a user has encountered a scam that is using a brand to impersonate a trusted entity, by detecting that a user has attempted to access a phishing website that is using a brand to impersonate a brand holder, by detecting that a user has attempted to access an illegitimate website that is using a brand without permission, by detecting that a user has received an illegitimate Internet communication that is using a brand without permission, and/or by detecting that a user has attempted to download or install an illegitimate application that may use a brand without permission. In some examples, detecting module 108 may block any detected fraudulent use of a brand. For example, detecting module 108 may block a user from accessing a phishing website or downloading illegitimate application.

As mentioned above, a fraudulent use of a brand may include a fraudulent use of an imitation of a brand. For at least this reason, detecting module 108 may determine what brand is being imitated in the fraudulent use of an imitation of a brand. For example, detecting module 108 may, after detecting a phishing website with the domain name "bankofamerixa.com," determine that the domain name of the phishing website is imitating a domain name "bankofamerica.com."

At step 308, one or more of the systems described herein may perform an action in response to detecting a fraudulent use of a brand. For example, performing module 110 may, as part of endpoint device 202, intermediate device 204, and/or server 206 in FIG. 2, perform an action in response to detecting an impersonation scam or attack that uses a brand. Upon completion of step 308, exemplary method 300 in FIG. 3 may terminate.

The systems described herein may perform step 308 in any suitable manner. In general, performing module 110 may simply recall and perform the actions that were selected to be performed by a brand-protection service by subscribers as part of step 302. In one example, if a subscriber selected or specified a legitimate website to which the brand-protection service should automatically redirect users that encounter a fraudulent use of a brand, performing module 110 may automatically redirect any or all users that encounter a fraudulent use of the brand to the legitimate website. For example, performing module 110 may automatically redirect a user that is attempting to access a phishing website that uses a brand of a brand holder to the brand holder's website. In another example, performing module 110 may automatically redirect a user that is attempting to access the website of an unauthorized reseller that uses a brand of a brand holder to a website of the brand holder or a website of an authorized reseller of the brand holder. In at least one example, performing module 110 may automatically redirect a user that is attempting to access an illegitimate website that is impersonating a legitimate website to the legitimate website (e.g., the website that the user thought he/she was attempting to access).

If a subscriber selected or specified information that the brand-protection service should present to users that encounter a fraudulent use of a brand, performing module 110 may present the information to any or all users that encounter a fraudulent use of the brand. For example, performing module 110 may present a link to a website of a brand holder to a user that is attempting to access a phishing website or any other illegitimate website that uses a brand of the brand holder. In another example, performing module 110 may present a link to a legitimate website (e.g., a website of a legitimate competitor of the brand holder) to a user that is attempting to access a phishing website or any other illegitimate website that uses a brand.

If a subscriber selected or specified a legitimate application that the brand-protection service should present to users that attempt to download or install an illegitimate application that uses a brand, performing module 110 may present the legitimate application to any or all users that attempt to download or install the illegitimate application. For example, performing module 110 may present an application of a brand holder to a user that is attempting to download or install an illegitimate application that uses a brand of the brand holder.

If a subscriber has instructed the brand-protection service to provide information about fraudulent uses of a particular brand to the subscriber, performing module 110 may aggregate information about any or all fraudulent uses of the brand and provide the aggregated information to the subscriber. For example, performing module 110 may, in response to detecting an impersonation attack, provide to a subscriber information that identifies the source of the attack, the duration of the attack, the entity hosting the attack, the number of users that have encountered the impersonation attack, and/or the identities of the users that have encountered the impersonation attack.

If a subscriber selected to have the brand-protection service attempt to reduce or eliminate fraudulent uses of a brand, performing module 110 may initiate one or more processes for reducing or eliminating fraudulent uses of the brand. For example, performing module 110 may initiate a process to take down an illegitimate website. In another example, performing module 110 may initiate a process to remove an illegitimate application from an application marketplace. In at least one example, performing module 110 may initiate a process to file a lawsuit on behalf of the brand-holder.

In some embodiments, the systems and methods described herein may monitor Internet traffic for fraudulent uses of a brand even though the holder of the brand is not a subscriber of a brand-protection service. In these situations, the systems and methods described herein may perform a variety of actions to encourage the holder of the brand to take advantage of the brand-protection offerings provided by the brand-protection service.

Figure 4:
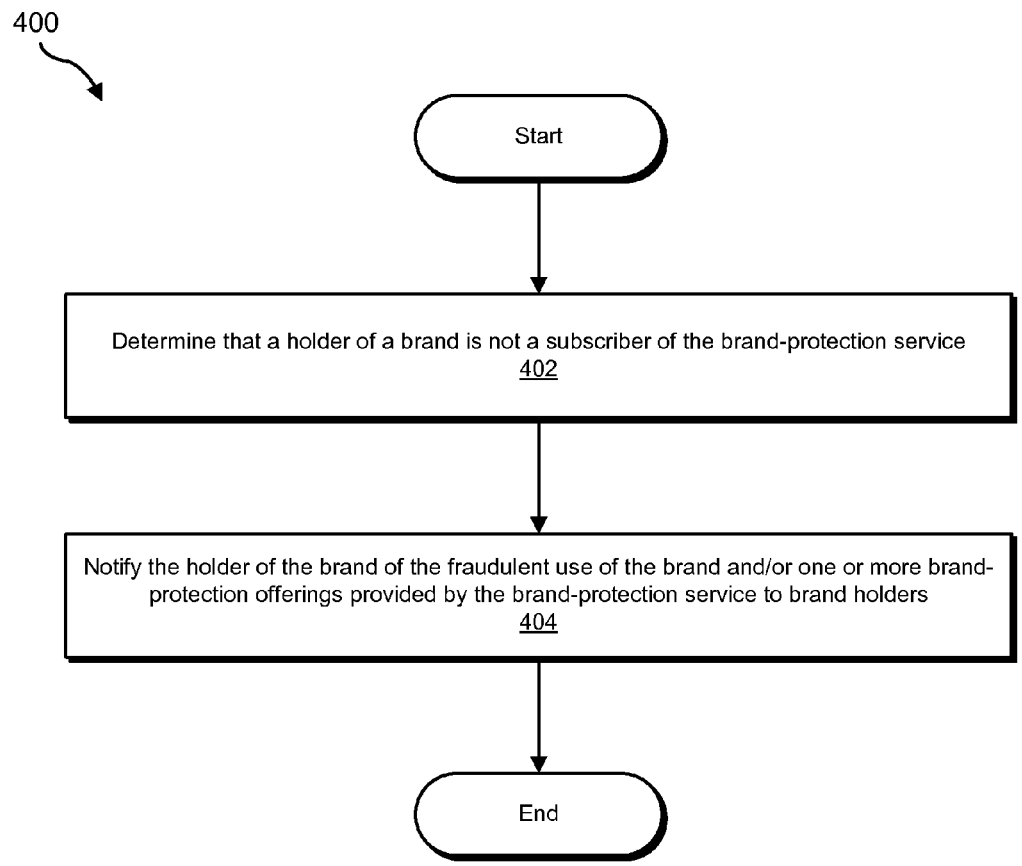
FIG. 4 is a flow diagram of an exemplary method for handling fraudulent uses of brands.

FIG. 4 illustrates an exemplary method 400 that provides an example of how the systems and methods described herein may encourage a holder of a brand to take advantage of the brand-protection offerings provided by a brand-protection service when a fraudulent use of the brand is detected at an Internet-traffic chokepoint managed by the brand-protection service. As shown in FIG. 4, at step 402, subscriber module 104 may, after a fraudulent use of a brand is detected (e.g., as part of step 306 in FIG. 3), determine that a holder of the brand is not a subscriber of the brand-protection service. Then at step 404 subscriber module 104 may notify (e.g., via an email or a website) the holder of the brand of the fraudulent use of the brand and/or the brand-protection offerings provided by the brand-protection service to brand holders. In some examples, subscriber module 104 may explain how the brand is being used without the brand holder's authorization, how many of the brand holder's users are encountering fraudulent uses of the brand, how the brand-protection offerings provided by the brand-protection service may protect the brand holder and/or the brand, and/or how the brand-protection service is currently protecting the brand.

As explained above, by monitoring Internet traffic at a large number of Internet-traffic chokepoints (e.g., endpoint devices, residential gateways, enterprise gateways, and carrier network devices) for fraudulent uses of brands (e.g., Internet-based scams or attacks that use the brands), the systems and methods described herein may enable a subscriber (e.g., a brand holder) of a brand-protection service to cause the brand-protection service to perform various brand-protecting actions whenever a fraudulent use of a particular brand of interest is detected via the Internet-traffic chokepoints. For example, the systems and methods described herein may enable a brand holder or other legitimate entity to select a website or webpage to which the Internet-traffic chokepoints controlled by the brand-protection service may redirect users whenever the users encounter a fraudulent use of a brand.

Figure 5:
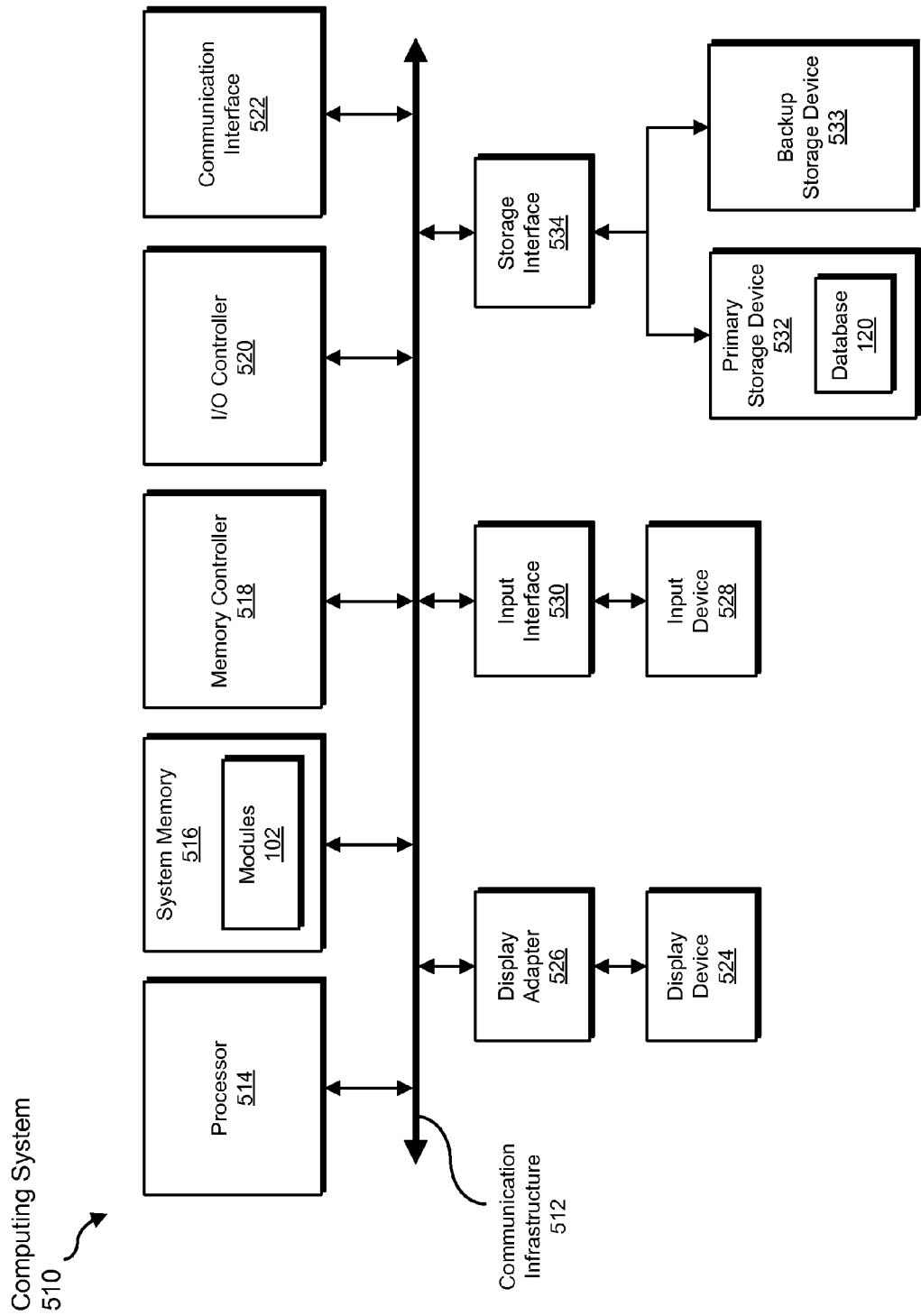
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
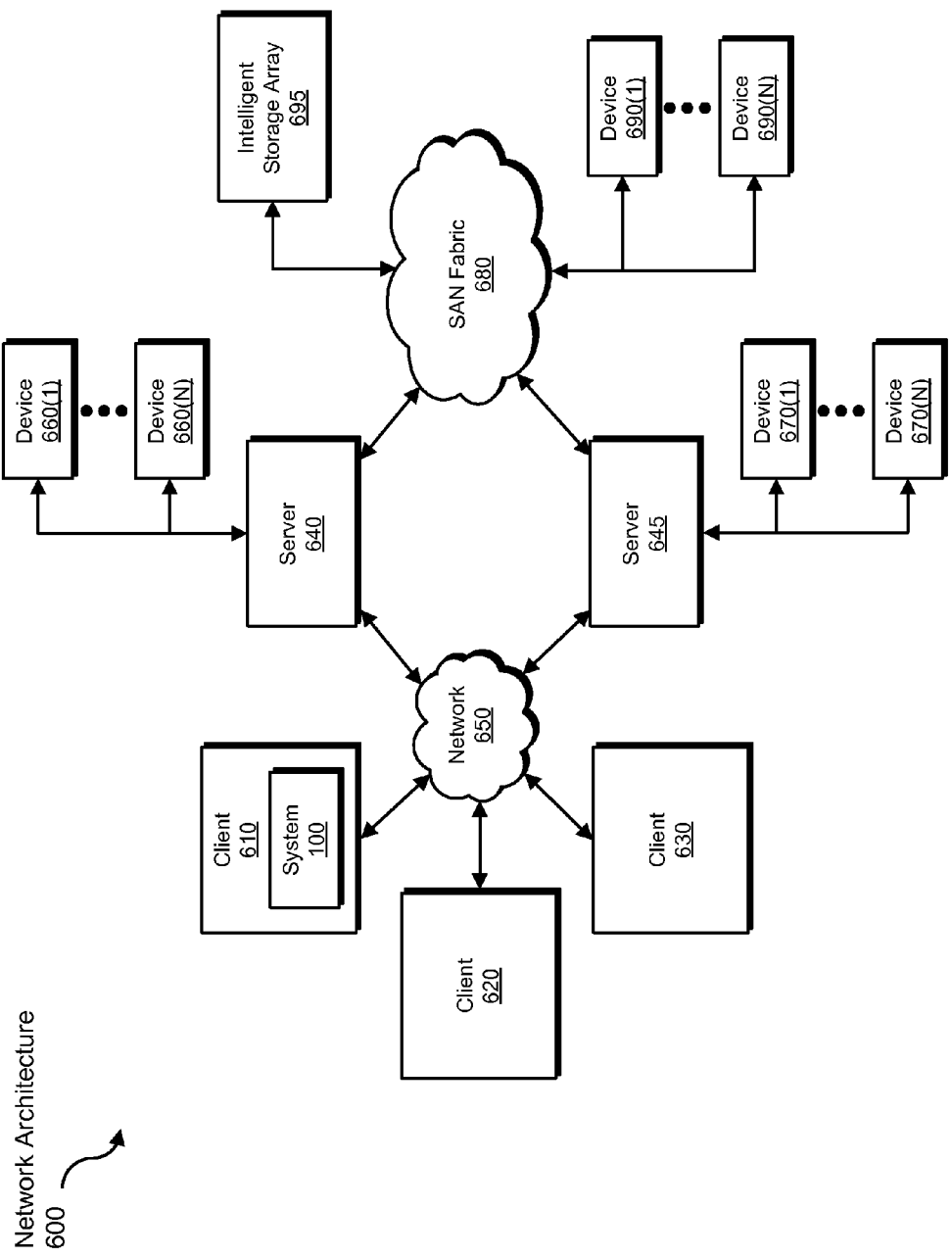
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for handling fraudulent uses of brands.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to perform an action when a fraudulent use of a brand is detected, transform the request into instructions to perform the action when a fraudulent use of the brand is detected, output a result of the transformation to an Internet-traffic chokepoint, use the result of the transformation to detect fraudulent uses of the brand and to perform the action at the Internet-traffic chokepoint, and store the result of the transformation to a storage device accessible to the Internet-traffic chokepoint. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for handling fraudulent uses of brands, at least a portion of the method being performed by a computing device comprising at least one processor, the method comprising:
  enabling, at a server of a brand-protection service, a subscriber of the brand-protection service to select an action to perform when a phishing attack that fraudulently uses a brand is detected in Internet traffic that is transmitted via any of a plurality of residential-gateway devices that:
    are owned by entities other than a provider of the brand-protection service and the subscriber; and
    comprise security software agents of the provider of the brand-protection service that:
      provide the entities with phishing-attack protection services; and
      enable the provider of the brand-protection service to detect phishing attacks that fraudulently use the brand at the plurality of residential-gateway devices;
  determining, by the server in response to a detection of the phishing attack that fraudulently uses the brand, that a holder of the brand has not subscribed to the brand-protection service;
  notifying, by the server in response to determining that the holder of the brand has not subscribed to the brand-protection service, the holder of the brand of at least one of:
    the phishing attack that fraudulently uses the band; and
    one or more brand-protection offerings provided by the brand-protection service to brand holders; and
  at each residential-gateway device of the plurality of residential-gateway devices while providing the phishing-attack protection services to an owner of the residential-gateway device as part of a security software agent:

monitoring Internet traffic for phishing attacks that fraudulently use the brand;

detecting, while monitoring the Internet traffic, the phishing attack that fraudulently uses the brand; and performing the action in response to detecting the phishing attack that fraudulently uses the brand, wherein the action comprises at least one of:

providing information about the phishing attack that fraudulently uses the brand to the subscriber;

automatically redirecting a user that encountered the phishing attack that fraudulently uses the brand to a legitimate website; and presenting a link to the legitimate website to the user that encountered the phishing attack that fraudulently uses the brand.

2. The method of claim 1, wherein the phishing attack that fraudulently uses the brand comprises a scam that uses the brand to impersonate a trusted entity.

3. The method of claim 1, wherein the phishing attack that fraudulently uses the brand comprises a phishing attack that uses the brand to impersonate the holder of the brand.

4. The method of claim 1, wherein the phishing attack that fraudulently uses the brand comprises a website that uses the brand without permission from the holder of the brand.

5. The method of claim 1, wherein the phishing attack that fraudulently uses the brand comprises an Internet communication that uses the brand without permission from the holder of the brand.

6. The method of claim 1, wherein the phishing attack that fraudulently uses the brand comprises an application that uses the brand without permission from the holder of the brand.

7. The method of claim 1, wherein the action comprises providing the information about the phishing attack that fraudulently uses the brand to the subscriber.

8. The method of claim 1, wherein the action comprises automatically redirecting the user that encountered the phishing attack that fraudulently uses the brand to the legitimate website.

9. The method of claim 1, wherein the action comprises presenting the link to the legitimate website to the user that encountered the phishing attack that fraudulently uses the brand.

10. The method of claim 1, wherein the phishing-attack protection services are free to the entities.

11. A system for handling fraudulent uses of brands, the system comprising:

a subscriber module, stored in memory, that:

enables, at a server of a brand-protection service, a subscriber of the brand-protection service to select an action to perform when a phishing attack that fraudulently uses a brand is detected in Internet traffic that is transmitted via any of a plurality of residential-gateway devices that:

are owned by entities other than a provider of the brand-protection service and the subscriber; and comprise security software agents of the provider of the brand-protection service that:

provide the entities with phishing-attack protection services; and enable the provider of the brand-protection service to detect phishing attacks that fraudulently use the brand at the plurality of residential-gateway devices;

determines, at the server in response to a detection of the phishing attack that fraudulently uses the brand, that a holder of the brand has not subscribed to the brand-protection service; and notifies, from the server in response to determining that the holder of the brand has not subscribed to the brand-protection service, the holder of the brand of at least one of:

the phishing attack that fraudulently uses the band; and one or more brand-protection offerings provided by the brand-protection service to brand holders;

a monitoring module, stored in memory, that monitors, as part of a security software agent at each residential-gateway device of the plurality of residential-gateway devices while providing, via the security software agent, the phishing-attack protection services to an owner of the residential-gateway device, Internet traffic for phishing attacks that fraudulently use the brand;

a detecting module, stored in memory, that detects, as part of the security software agent while monitoring the Internet traffic, the phishing attack that fraudulently uses the brand;

a performing module, stored in memory, that performs, as part of the security software agent, the action in response to detecting the phishing attack that fraudulently uses the brand, wherein the action comprises at least one of:

providing information about the phishing attack that fraudulently uses the brand to the subscriber;

automatically redirecting a user that encountered the phishing attack that fraudulently uses the brand to a legitimate website; and presenting a link to the legitimate website to the user that encountered the phishing attack that fraudulently uses the brand; and at least one hardware processor that executes the subscriber module, the monitoring module, the detecting module, and the performing module.

12. The system of claim 11, wherein the monitoring module monitors Internet traffic for phishing attacks that fraudulently use the brand by monitoring email communications for phishing attacks that fraudulently use the brand.

13. The system of claim 11, wherein the monitoring module monitors Internet traffic for phishing attacks that fraudulently use the brand by monitoring web traffic for phishing attacks that fraudulently use the brand.

14. The system of claim 11, wherein the monitoring module monitors Internet traffic for phishing attacks that fraudulently use the brand by monitoring application downloads for phishing attacks that fraudulently use the brand.

15. The system of claim 11, wherein the subscriber of the brand-protection service is a competitor of the holder of the brand.

16. The system of claim 11, wherein the phishing-attack protection services are free to the entities.

17. A non-transitory computer-readable medium comprising one or more computer-executable instructions that, when executed by at least one processor of a computing device, cause the computing device to:

enable a subscriber of a brand-protection service to select an action to perform when a phishing attack that fraudulently uses a brand is detected in Internet traffic that is transmitted via any of a plurality of residential-gateway devices that:

are owned by entities other than a provider of the brand-protection service and the subscriber; and comprise security software agents of the provider of the brand-protection service that:
  provide the entities with phishing-attack protection services; and
  enable the provider of the brand-protection service to detect phishing attacks that fraudulently use the brand at the plurality of residential-gateway devices;
determine, in response to a detection of the phishing attack that fraudulently uses the brand, that a holder of the brand has not subscribed to the brand-protection service;
notify, in response to determining that the holder of the brand has not subscribed to the brand-protection service, the holder of the brand of at least one of:
  the phishing attack that fraudulently uses the band; and
  one or more brand-protection offerings provided by the brand-protection service to brand holders; and
at each residential-gateway device of the plurality of residential-gateway devices while providing the phishing-attack protection services to an owner of the residential-gateway device as part of a security software agent:
monitor Internet traffic for phishing attacks that fraudulently use the brand;
detect, while monitoring the Internet traffic, the phishing attack that fraudulently uses the brand; and
perform the action in response to detecting the phishing attack that fraudulently uses the brand, wherein the action comprises at least one of:
  providing information about the phishing attack that fraudulently uses the brand to the subscriber;
  automatically redirecting a user that encountered the phishing attack that fraudulently uses the brand to a legitimate website; and
  presenting a link to the legitimate website to the user that encountered the phishing attack that fraudulently uses the brand.

\* \* \* \* \*

UNITED STATES PATENT AND TRADEMARK OFFICE
CERTIFICATE OF CORRECTION

PATENT NO.         : 9,971,878 B2
APPLICATION NO.    : 14/469571
DATED              : May 15, 2018
INVENTOR(S)        : Nachenberg Page 1 of 1

It is certified that error appears in the above-identified patent and that said Letters Patent is hereby corrected as shown below:

In the Claims

Column 18, Line 63, Claim 1, delete "band;" and insert -- brand; --, therefor.

Column 20, Line 9, Claim 12, delete "band;" and insert -- brand; --, therefor.

Column 21, Line 16, Claim 20, delete "band;" and insert -- brand; --, therefor.

Signed and Sealed this
Twenty-fourth Day of July, 2018

Andrei Iancu
*Director of the United States Patent and Trademark Office*